Figure 1:
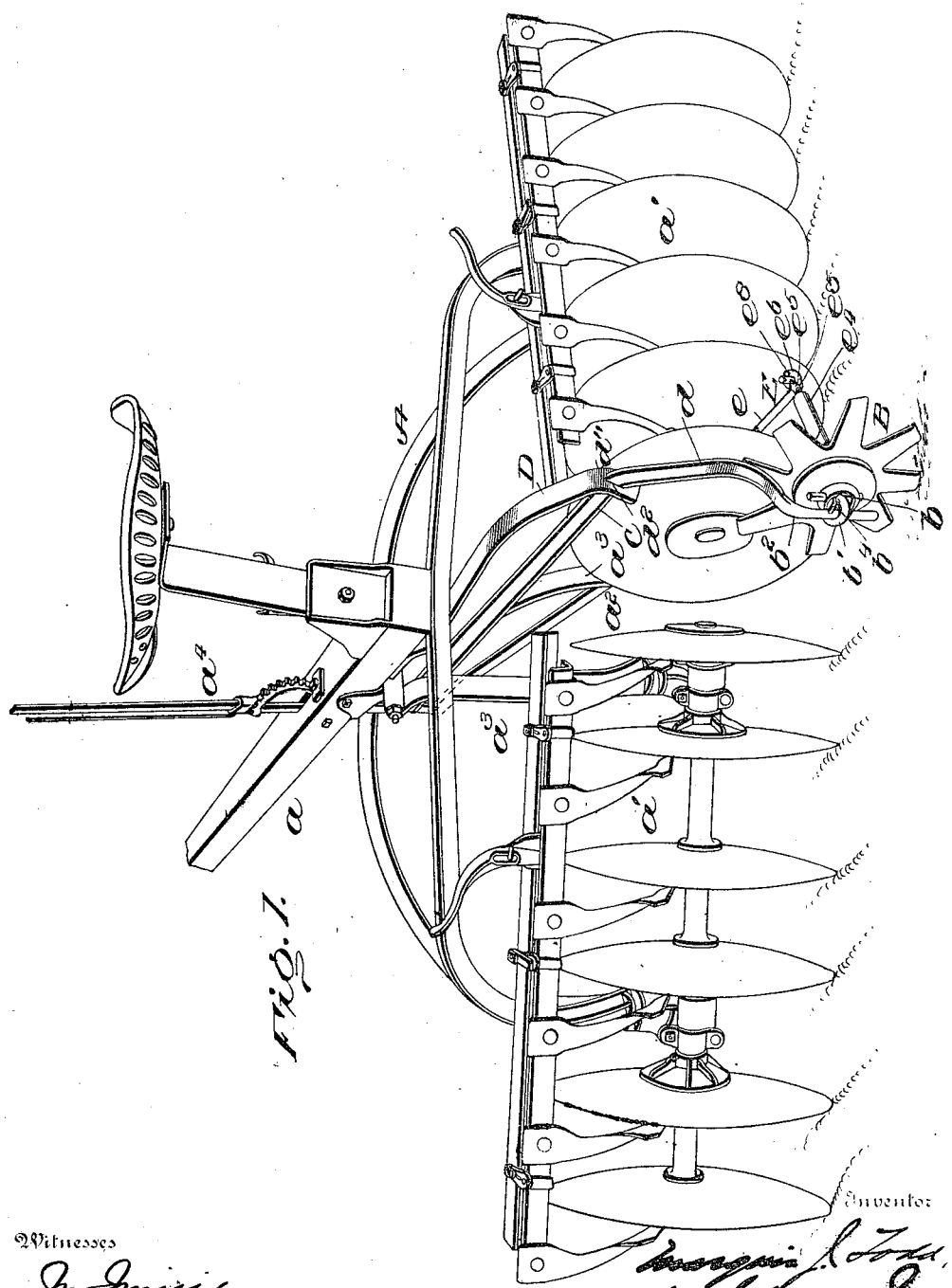

No. 631,598. Patented Aug. 22, 1899.
M. J. TODD.
HARROW.
(Application filed Apr. 12, 1899.)
(No Model.) 2 Sheets—Sheet 1.

No. 631,598. Patented Aug. 22, 1899.
M. J. TODD.
HARROW.
(Application filed Apr. 12, 1899.)
(No Model.) 2 Sheets—Sheet 2.
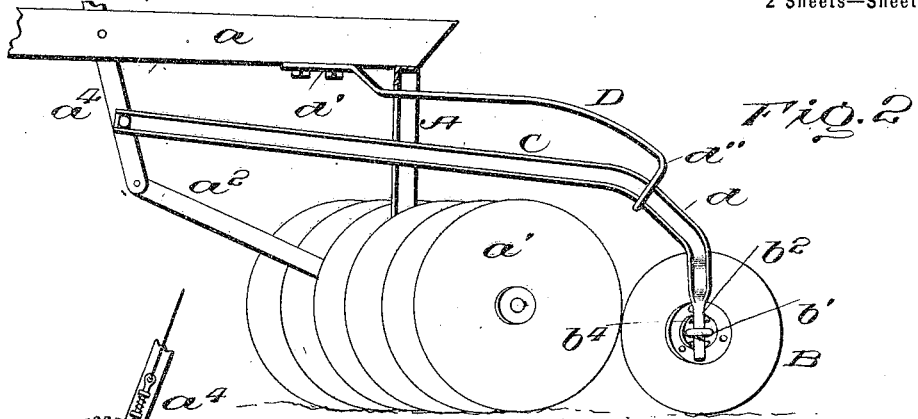
Fig. 2.
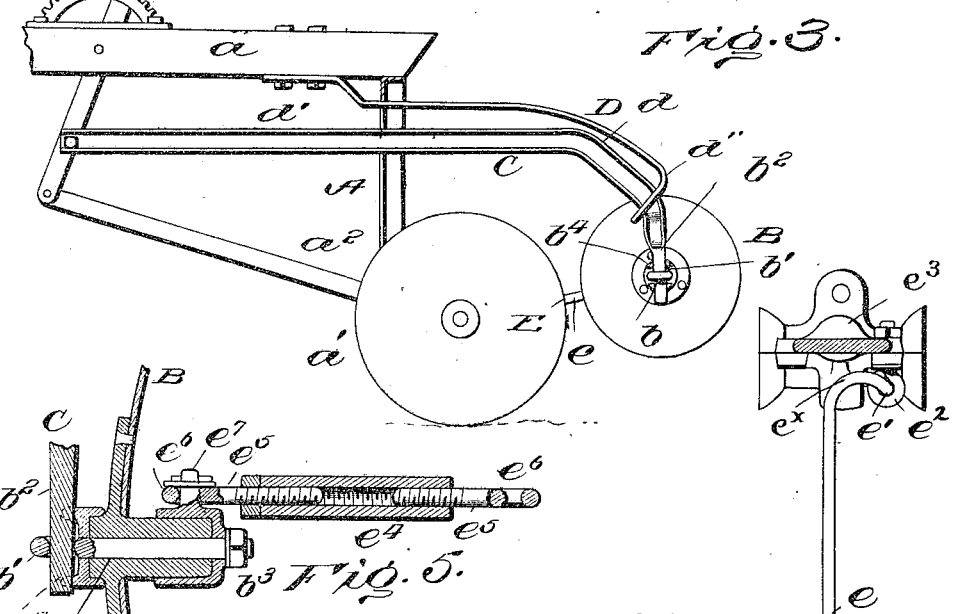
Fig. 3.
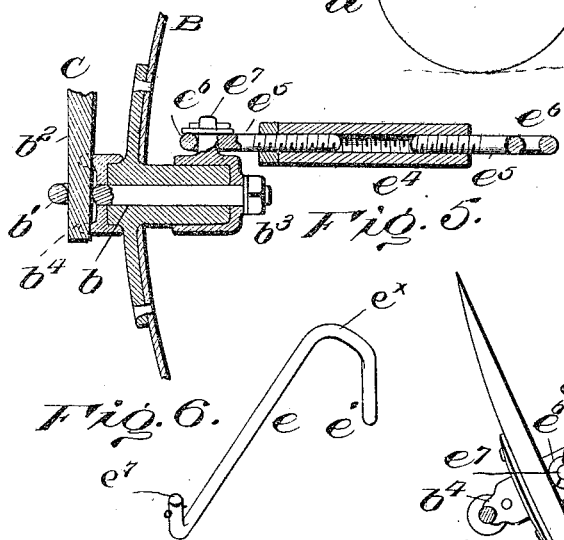
Fig. 5.
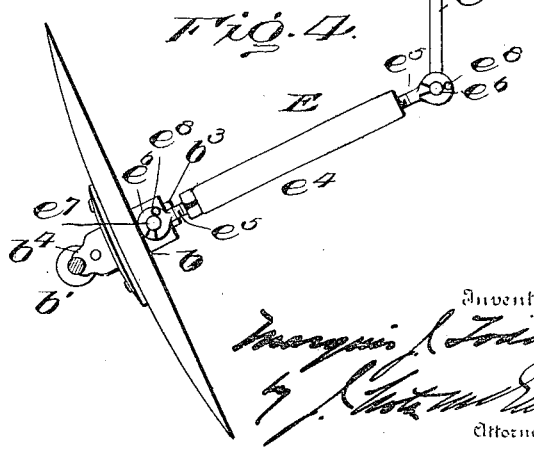
Fig. 4.
Fig. 6.
Witnesses
Inventor
Margurie J. Todd
Attorney

UNITED STATES PATENT OFFICE.

MARQUIS J. TODD, OF BUFFALO, NEW YORK.

HARROW.

SPECIFICATION forming part of Letters Patent No. 631,598, dated August 22, 1899.

Application filed April 12, 1899. Serial No. 712,788. (No model.)

*To all whom it may concern:*

Be it known that I, MARQUIS J. TODD, of Buffalo, in the county of Erie and State of New York, have invented certain new and useful Improvements in Harrows; and I do hereby declare the following to be a full, clear, and exact description of the invention, such as will enable others skilled in the art to which it appertains to make and use the same.

This invention contemplates certain new and useful improvements in harrows.

The primary objects of the invention are to automatically raise the central disk when the disk gangs between which it is located are thrown out of working position, to force and hold the disk down to its work when the gangs are thrown into working position, and to allow such disk to yield upon contacting with stones or other obstructions.

A further object is to maintain the central disk in line between the two gangs of disks, thereby preventing it from working too near either gang and avoid strain on its standard, and a further object is to effect the operation of the central disk—that is, throwing it into and out of engagement with the soil—by the operation of the gang-adjusting mechanism.

The disk-carrying standard is capable of longitudinal movement, and when so moved the disk is either raised or lowered. By connecting the standard to the gang-adjusting lever the central disk is thrown into or out of working position simultaneously with the movement of the gangs. The movements of the standard are slower than those of the gangs. In this way the central disk is kept well up to the inner ends of the gangs. An adjustable bell-crank lever connected to the disk-bearing maintains the disk in central line between the gangs.

The invention will be hereinafter fully set forth, and particularly pointed out in the claims.

In the accompanying drawings, Figure 1 is a view in perspective of a harrow with my improvement attached. Figs. 2 and 3 are side views with one of the gangs removed, in the former the disks being shown in, and in the latter out of, working positions. Fig. 4 shows the disk-holding mechanism. Fig 5 is a longitudinal sectional view of a portion thereof and hub of disk. Fig. 6 is a detail.

Referring to the drawings, A designates the harrow-frame, of which the pole $a$ is a part. The disk gangs $a'$, the adjusting-bars $a^2$, spring-pressure bars $a^3$, and operating-lever $a^4$ are shown as in Letters Patent No. 527,352, granted to me October 9, 1894.

B is the central disk, which is shown in Fig. 1 as being of the spade cutting-pattern, although any style disk may be used. Its axial bearing $b$ has a central longitudinal opening to accommodate an eyebolt $b'$. Through the eye of this bolt is inserted the lower rounded portion $b^2$ of the disk-carrying standard C. By tightening up the nut $b^3$ the eyebolt will draw the standard into recesses in upper and lower flanges $b^4$, formed with the bearing $b$, thereby binding the standard to the bearing. The standard C above the rounded portion is carried upward and slightly inward, is then bent into an oblique portion $d$, from the forward end of which the standard is carried forward on an approximately horizontal line beneath the pole $a$, and at its forward end is pivoted to the operating-lever $a^4$, to which are also connected the adjusting-bars $a^2$. The connection of the standard to lever $a^4$ is nearer to the fulcrum of the latter than is the connection of the bars $a^2$. By operating the lever $a^4$ the disk-carrying standard will be adjusted simultaneously with the shifting of the disk gangs and will be moved slower than the latter. In this way the disk is always kept well up to the inner ends of the gangs without contacting with the latter.

D is a guide or support for the disk-carrying standard, its function being to hold the disk elevated or depressed, according as the disks are thrown out of or into working positions. This guide or support is shown as being composed of a bar bolted at its forward end $d'$ to the under side of the pole and extended rearward above the standard and then carried downward, its extreme end portion $d$ being bent inward at practically right angles and formed with a slot $d^2$. When the standard is thrown rearward, the disk-carrying end thereof is forced downward by the wedge-like action of the guide exerted on the oblique portion of the standard, and the pressure of the guide keeps the disk down to its work. When the standard is drawn forward, it elevates the disk, holding it away from the ground. These results are obtained by the shifting of the disk-carrying standard up and down simultaneous with its longitudinal movement. The bar of which the guide or support is composed is preferably a spring-bar, and for this purpose it is more or less curved throughout its entire length down to the slotted end portion. Thus a yielding action is obtained and the central cutting-disk is not only held down to its work, but is free to ride upon meeting stones or other obstructions. As the gangs are thrown into a straight line out of their working positions the central disk is drawn forward and upward.

E is a bell-crank connection between the central disk and one of the gangs, its purpose being to maintain the disk in central line between the gangs. It comprises a horizontal arm $e$, having a vertical portion $e'$, fitted in eyebolts $e^2$ of the bearings $e^3$ of one of the gangs, and a turnbuckle $e^4$, pivotally connected to the outer end of arm $e$ and to the bearing $b$ of the disk B. The arm $e$ is bent at $e^x$, so that it will engage with the rear side of bearings $e^3$, which acts as a stop to limit the movement of the arm, thereby making a rigid connection with the central disk and also keeping the arm out of contact with the end disk of the gang. The turnbuckle comprises two threaded rods $e^5$, having eyes $e^6$, one to receive the upturned end of arm $e$ and the other a lug $e^7$ of bearing $b$. These eye-rods are held in place by keys $e^8$. By disengaging the outer end of one of the rods $e^5$ and then turning the latter the connection may be lengthened or shortened. In this way the central disk may always be maintained in proper relation to the ends of the gangs at the different angles to the line of draft and kept up to its work without strain upon its carrying-standard.

In practice the central disk constantly exerts a pull upon the connection with the arm $e$, and when the gangs are thrown out of work the central disk is free to move forward without binding.

The advantages of my invention are apparent.

It is obvious that changes may be made in the construction and relative arrangement of parts without departing from the scope of the invention.

I claim as my invention—

1. A harrow having gangs, a disk centrally of said gangs; and means for automatically lowering and raising the disk as the harrow is thrown into and out of operation.

2. In a harrow having disk gangs and means for adjusting the same relatively to the line of draft, a central disk, and means for automatically lowering and raising the disk as the disk gangs are thrown into and out of operation.

3. In a harrow having disk gangs and means for adjusting the same relatively to the line of draft, a central disk connected to said means whereby the latter will effect the simultaneous adjustment of the disk and the gangs.

4. In a harrow having disk gangs, and means for adjusting the same relatively to the line of draft, a central disk connected to said means, and means for automatically lowering and raising the disk as the disk gangs are thrown in and out of operation.

5. In a harrow having disk gangs, and means for adjusting the same relatively to the line of draft, a central disk, and means for raising and lowering said disk simultaneously but at a differential movement with the gang-adjusting means.

6. In a harrow, the combination with the disk gangs, and the operating-lever therefor, of a central disk and a standard on one end of which said disk is mounted, the other end of the standard being connected to the lever, substantially as set forth.

7. In a harrow, the combination with the disk gangs, the operating-lever and adjusting means connecting the latter to said gangs, of a central disk, a standard therefor connected to said lever nearer to the fulcrum thereof than the said adjusting means, and means with which said standard is in engagement intermediate its length for raising and lowering the disk as the standard is moved longitudinally, substantially as set forth.

8. In a harrow, the combination with the disk gangs, of a central disk, a standard for said disk, means for moving such standard longitudinally, and a guide or support in engagement with said standard intermediate of the disk and the means for moving same whereby as the standard is adjusted the disk will be raised or lowered.

9. In a harrow, the combination with the disk gangs, and the operating-lever therefor, of a central disk, a standard for said disk connected to said operating-lever, and a guide with which said standard engages, substantially as set forth.

10. In a disk harrow, a central independent disk, a standard therefor having an oblique portion, means for moving such standard longitudinally, and a guide with which the oblique portion of said standard engages, substantially as set forth.

11. In a disk harrow, a central independent disk, a standard therefor having an oblique portion, means for moving such standard longitudinally, and a bar having a slot therein in which the oblique portion of said standard is designed to work, substantially as set forth.

12. In a disk harrow, a central independent disk, a standard therefor having an oblique portion, an operating-lever to which such standard is connected, and a bar having a slot in which said oblique portion is designed to work, substantially as set forth.

13. In a harrow having disk gangs, and an operating-lever therefor, a central disk, a standard therefor having an oblique portion and connected at one end to said lever, and a bar having a slot in which said oblique portion is designed to work, substantially as set forth.

14. A disk harrow having a central independent disk, a standard therefor, and yielding means for depressing said disk.

15. A disk harrow having a central independent disk, a standard therefor, and a spring-bar with which said standard engages, substantially as set forth.

16. A disk harrow having a central independent disk, a pivoted support therefor, and a spring exerting a downward pressure on said disk, substantially as set forth.

17. In a disk harrow, a central independent disk, a support therefor, means for moving such support, and a guide with which such support is in constant engagement, the latter being such that a wedge-like action is exerted on said support to depress or raise said disk during the adjustment of the support, substantially as set forth.

18. The combination with the disk gangs, of the central disk, the standard therefor having an oblique portion, a spring-bar having a slot in which said oblique portion is designed to work, and a lever for moving said standard back and forth, substantially as set forth.

19. The combination with the frame, the disk gangs, and the operating-lever therefor, of the central disk, the standard therefor connected to said lever and having an oblique portion, and the bar secured to said frame and extended over said standard and having an angular end formed with a slot in which said oblique portion is designed to work, substantially as set forth.

20. In a harrow having disk gangs, a central disk, a bearing therefor, an adjustable connection between said bearing and one of the disk gangs and a stop to limit the movement of such connection.

21. In a harrow having disk gangs, a central disk, a bearing therefor, a compensating connection between said disk and one of the gangs and a stop to limit the movement of such connection.

22. In a harrow having disk gangs, a central disk, a bearing therefor, an arm loosely secured at one end to one of the gangs, a stop to limit the movement of the arm and an adjustable connection between such arm and the central disk, substantially as set forth.

23. In a harrow having disk gangs, a central disk, a bearing therefor, an arm secured at one end to one of said gangs, and a turnbuckle connecting the other end of said arm to said bearing, substantially as set forth.

24. In a disk harrow having an operating-lever, a standard connected at one end to said lever and having a rounded portion, a central disk, a bearing therefor having upper and lower recessed flanges, and an eyebolt designed to engage and hold said rounded portion in the recesses of said flanges, substantially as set forth.

25. In a harrow having disk gangs and a central disk, a standard therefor operated by the adjustment of the gangs, and an engaging device for forcing the disk downward when the standard is moved in one direction and raising it when the standard is moved in the opposite direction.

In testimony whereof I have signed this specification in the presence of two subscribing witnesses.

MARQUIS J. TODD.

Witnesses:
C. M. GREINER,
J. H. REINNOGEL.